(12) United States Patent
Liu et al.

(10) Patent No.: US 12,204,836 B1
(45) Date of Patent: Jan. 21, 2025

(54) METHOD AND SYSTEM FOR PARALLEL DESIGN AND TECHNOLOGY OPTIMIZATION

(71) Applicant: Primarius Technologies Co., Ltd., Shanghai (CN)

(72) Inventors: Zhihong Liu, Cupertino, CA (US); Yutao Ma, San Jose, CA (US)

(73) Assignee: Primarius Technologies Co., Ltd., Shanghai (CN)

( * ) Notice: Subject to any disclaimer, the term of this patent is extended or adjusted under 35 U.S.C. 154(b) by 516 days.

(21) Appl. No.: 17/550,238

(22) Filed: Dec. 14, 2021

Related U.S. Application Data

(60) Provisional application No. 63/125,930, filed on Dec. 15, 2020.

(51) Int. Cl.
*G06F 30/367* (2020.01)
*G06F 30/373* (2020.01)
*G06F 111/10* (2020.01)

(52) U.S. Cl.
CPC .......... *G06F 30/367* (2020.01); *G06F 30/373* (2020.01); *G06F 2111/10* (2020.01)

(58) Field of Classification Search
CPC ................. G06F 30/367; G06F 30/373; G06F 2111/10
See application file for complete search history.

(56) References Cited

U.S. PATENT DOCUMENTS

| | | | | |
|---|---|---|---|---|
| 6,560,755 | B1* | 5/2003 | Zhang | G06F 30/367 716/136 |
| 8,726,212 | B1* | 5/2014 | Huang | G06F 30/367 716/132 |
| 9,009,638 | B1* | 4/2015 | Hook | G06F 30/367 716/136 |
| 2004/0015793 | A1* | 1/2004 | Saxena | G01R 31/318357 716/102 |
| 2014/0244223 | A1* | 8/2014 | Fang | G06F 30/367 703/2 |
| 2015/0089463 | A1* | 3/2015 | Kuo | G06F 30/367 716/106 |
| 2016/0232270 | A1* | 8/2016 | Chou | G06F 30/398 |
| 2016/0267205 | A1* | 9/2016 | Wang | G06F 30/367 |

(Continued)

*Primary Examiner* — Nha T Nguyen
(74) *Attorney, Agent, or Firm* — Silicon Valley Patent Group LLP; Thomas C. Chan

(57) ABSTRACT

Method and System for Parallel Design and Technology Optimization are disclosed. The disclosed method enables efficient parallel design and technology optimization (PDTO) and allow designers to sign off the technology development or find the optimal design point with the design analysis tools. The method includes generating, from a manufacturing technology process, a baseline SPICE model based on technology specification and manufacturing process data; extending the baseline SPICE model to a corresponding description of technology specification window in the circuit design process, where the technology specification window describes extended ranges of device model parameters; extracting a targeted SPICE model using the technology specification window; verifying, by a circuit design process that operates in parallel to the manufacturing technology process, the integrated circuit meets a design specification using the targeted SPICE model.

20 Claims, 16 Drawing Sheets

(56) References Cited

U.S. PATENT DOCUMENTS

2021/0181250 A1\* 6/2021 Fang ................ G01R 27/28
2021/0319164 A1\* 10/2021 Liebmann ............ G06F 30/398
2024/0170295 A1\* 5/2024 Chen .................... H01L 21/477
2024/0176812 A1\* 5/2024 Evans .................... G06F 16/48

\* cited by examiner

METHOD AND SYSTEM FOR PARALLEL DESIGN AND TECHNOLOGY OPTIMIZATION

CROSS-REFERENCE TO RELATED APPLICATIONS

This application claims the benefit of U.S. provisional patent application No. 63/125,930, "Method and System for Design and Technology Co-Optimization," filed Dec. 15, 2020. The aforementioned United States patent application is assigned to the assignee hereof and is hereby incorporated by reference in its entirety.

FIELD

The present disclosure relates to the field of electronic design automation tools. In particular, the present disclosure relates to methods and systems for parallel design and technology optimization for integrated circuits.

BACKGROUND

An integrated circuit is a network of circuit elements such as resistors, capacitors, inductors, mutual inductors, transmission lines, diodes, bipolar junction transistors (BJT), junction field effect transistors (JFET), metal-oxide-semiconductor field effect transistors (MOSFET), metal-semiconductor field effect transistors (MESFET), thin-film transistors (TFT), etc.

The development of complicated integrated circuits often requires the use of powerful numerical simulation programs. For example, circuit simulation is an essential part in the design flow of integrated circuits, helping circuit designers to verify the functionality and performance of their designs without going through expensive fabrication processes. As the semiconductor processing technology migrates to nanometer dimensions, new simulation methodologies are needed to solve the new problems intrinsically existing in circuit design with nanometer features. Modern integrated circuits continually challenge circuit simulation algorithms and implementations in the development of new technology generations. The semiconductor industry requires EDA software with the ability to analyze nanometer effects like coupling noise, ground bounce, transmission line wave propagation, dynamic leakage current, supply voltage drop, and nonlinear device and circuit behavior, which are all related to dynamic current. Thus, detailed circuit simulation and transistor-level simulation have become one of the most effective ways to investigate and resolve issues with nanometer designs.

Examples of electronic circuit simulators include the Simulation Program with Integrated Circuit Emphasis (SPICE) developed at the University of California, Berkeley (UC Berkeley), and various enhanced versions or derivatives of SPICE. SPICE and its derivatives or enhanced versions will be referred to hereafter as SPICE circuit simulators, or SPICE. The SPICE method considers a circuit as a non-divided object.

SPICE-like simulations may provide fairly accurate predictions of how corresponding circuits will behave when actually built. The predictions are preferably made not only for individual sub-circuit but also for whole systems (e.g., whole integrated circuits) so that system-wide problems relating to noise and the like may be uncovered and dealt with. In a general process flow of a SPICE-like simulation, an analog integrated circuit under simulation is often represented in the form of a netlist description. A netlist is a circuit description of the analog circuit to be simulated written in a SPICE-like language. SPICE netlists are pure structural languages with simulation control statements. Other languages like Verilog-A™ have the capability to include behavioral constructs. The structural netlist of SPICE together with a predefined set of circuit components of the analog integrated circuit may be represented in the form of a matrix in accordance with certain circuit modeling methodologies (which is not a concern of the present disclosure). The number of non-linear differential equations ranges from 1 to n. There are a corresponding number of input vectors to be operated by the linear equation. The set of input vectors are shown as $\{I_1, I_2, \ldots I_n\}$. Next, the linear matrix is computed with the set of input vectors to generate a set of solution vectors $\{V_1, V_2, \ldots V_n\}$. The computation is repeated until the set of solutions converge. The set of solutions may be then displayed in the form of waveforms, measurements, or checks on a computer screen for engineers to inspect the simulation results.

However, SPICE-like simulation of a whole system becomes more difficult and problematic as the industry continues its relentless trek of scaling down to smaller and smaller device geometries and of cramming more interconnected components into the system. An example of such down scaling is the recent shift from micron-sized channels toward deep submicron sized transistor channel lengths. Because of the smaller device geometries, a circuit designer are able to cram exponentially larger numbers of circuit components (e.g., transistors, diodes, capacitors) into a given integrated circuit (IC), and therefore increases the matrix size to a complexity which may not be solved in a desired time frame.

A circuit may be represented as a large numerically discrete nonlinear matrix for analyzing instant current. The matrix dimension is of the same order as the number of the nodes in the circuit. For transient analysis, this giant nonlinear system needs to solve hundreds of thousand times, thus restricting the capacity and performance of the SPICE method. The SPICE method in general can simulate a circuit up to about 50,000 nodes. Therefore it is not practical to use the SPICE method in full chip design. It is widely used in cell design, library building, and accuracy verification.

With some accuracy lost, the Fast SPICE method developed in the early 1990s provides capacity and speed about two orders of magnitude greater than the SPICE method. The performance gain was made by employing simplified models, circuit partition methods, and event-driven algorithms, and by taking advantage of circuit latency.

SPICE models a circuit in a node/element fashion, i.e., the circuit is regarded as a collection of various circuit elements connected at nodes. At the heart of SPICE is the so-called Nodal Analysis, which is accomplished by formulating nodal equations (or circuit equations) in matrix format to represent the circuit and by solving these nodal equations. The circuit elements are modeled by device models, which produce model results that are represented in the circuit equations as matrices.

A device model for modeling a circuit element, such as the SPICE model for modeling MOSFET devices, developed by UC Berkeley, typically includes model equations and a set of model parameters that mathematically represent characteristics of the circuit element under various bias conditions. For example, a circuit element with n terminals can be modeled by the following current-voltage relations:

$$I_i = f_i(V_1, \ldots, V_n, t) \text{ for } i=1, \ldots, n,$$

where $I_i$ represents the current entering terminal I; $V_j$ (j=1, ..., n) represents the voltage or terminal bias across terminal j and a reference terminal, such as the ground; and t represents the time. The Kirchhoff's Current Law implies that the current entering terminal n is given by $$I_n = \sum_{i=1}^{n-1} I_i.$$

A conductance matrix of the circuit element is defined by:

$$G(V_1, \ldots, V_n, t) := \begin{pmatrix} \frac{\partial f_1}{\partial V_1} & \cdots & \frac{\partial f_1}{\partial V_n} \\ \vdots & \ddots & \vdots \\ \frac{\partial f_n}{\partial V_1} & \cdots & \frac{\partial f_n}{\partial V_n} \end{pmatrix}.$$

To model the circuit element under alternating current (AC) operations, the device model also considers the relationship between node charges and the terminal biases:

$$Q_i = q_i(V_1, \ldots, V_n, t) \text{ for } i=1, \ldots, n.$$

where $Q_i$ represents the node charge at terminal i. Thus, the capacitance matrix of the n-terminal circuit element is defined by $$C(V_1, \ldots, V_n, t) := \begin{pmatrix} \frac{\partial q_1}{\partial V_1} & \cdots & \frac{\partial q_1}{\partial V_n} \\ \vdots & \ddots & \vdots \\ \frac{\partial q_n}{\partial V_1} & \cdots & \frac{\partial q_n}{\partial V_n} \end{pmatrix}.$$

FIG. 1 illustrates a conventional method of design and technology interaction. As shown in FIG. 1, the conventional PDTO flow starts in block 102 where a technology specification is provided. The technology specifications are desired electrical qualifications of a technology while the design specifications are criterions of circuit figure-of-merits (FOMs). In block 104, a technology computer aided design (TCAD) tool uses the technology specification and process data 106 to generate device data 108. Process data are physical properties like oxide thickness, doping density, gate pitch, etc., and device data are I-V and C-V curves. In block 110, SPICE extraction is performed using the device data 108 to generate a process design kit (PDK) to be provided to the circuit design team. In block 112, the circuit design team performs circuit simulation using the PDK (not shown) from the manufacturing process and design specification 114 to verify the design of an integrated circuit. In block 116, an inquiry is made whether the integrated circuit being designed meets the design specification 114. If the design specification is not met (116_No), the process goes back and repeats at block 102. If the design specification is met (116_Yes), the process ends in block 118. As described above, the conventional PDTO involves TCAD, SPICE extraction, and circuit design teams in a concerted effort to optimize power, performance, area, and cost (PPAC) of a given technology, usually iterating design rules and SPICE models through the PDK as the interface medium between the manufacturing process team and the circuit design team.

One of the issues in the conventional PDTO flow is the model turnaround time. Since model extraction relies mainly on manpower and sometimes ambiguous accuracy requirements, it usually takes a few weeks, if not months, to extract an accurate SPICE model. The slow model cycle time prohibits meaningful iterations between manufacturing technology processes and circuit design processes. In today's foundry and fabless model, fabless companies are unable to weigh in on the manufacturing technology process in the beginning. They can only refer to the PDK provided by the foundry after most iterations have been made. Typically the SPICE models belong to foundry, which causes the separation of a manufacturing technology process loop and a circuit design process loop, and makes co-optimization of the technology process and the design process impractical. In addition, since model parameters are either purely empirical or often used in an empirical way, designers are usually facing challenges in understanding the usage of the model parameters and their effects on the device characteristics, which makes model adjustment by fabless companies impractical.

Therefore, there is a need for methods and systems that address the issues of the conventional design and technology interaction systems described above. Specifically, there is a need for methods and systems for parallel design and technology optimization (PDTO).

SUMMARY

Method and system are disclosed for resolving various issues in the conventional PDTO flow. The present disclosure enables efficient parallel design and technology optimization and allows designers to sign off the technology development or find the optimal design point with the design analysis tools. This methodology is especially suitable for memory integrated design manufacturers (IDMs) due to the digital nature of their products and smaller fabless companies to collaborate with foundry in the early co-optimization stage when a new manufacturing technology process is being developed.

Method and system are disclosed for parallel design and technology optimization. In one embodiment, a computer implemented method for parallel design and technology optimization includes generating, from a manufacturing technology process, a baseline SPICE model based on technology specification and manufacturing process data; extending the baseline SPICE model to a corresponding description of technology specification window in the circuit design process, where the technology specification window describes extended ranges of device model parameters; extracting a targeted SPICE model using the technology specification window; verifying, by a circuit design process that operates in parallel to the manufacturing technology process, the integrated circuit meets a design specification using the targeted SPICE model.

In another embodiment, a system for parallel design and technology optimization include a plurality of memory configured to store data of a manufacturing technology process and a circuit design process; a plurality of processors configured to: generate, from the manufacturing technology process, a baseline SPICE model based on technology specification and manufacturing process data; extend the baseline SPICE model to a corresponding description of technology specification window in the circuit design process, where the technology specification window describes extended ranges of device model parameters; extract a targeted SPICE model using the technology specification window; verify, by the circuit design process that operates in parallel to the manufacturing technology process, the integrated circuit meets a design specification using the targeted SPICE model.

BRIEF DESCRIPTION OF THE DRAWINGS

The aforementioned features and advantages of the disclosure, as well as additional features and advantages thereof, will be more clearly understandable after reading detailed descriptions of embodiments in conjunction with the following drawings.

Like numbers are used throughout the figures.

DESCRIPTION OF EMBODIMENTS

Figure 1:
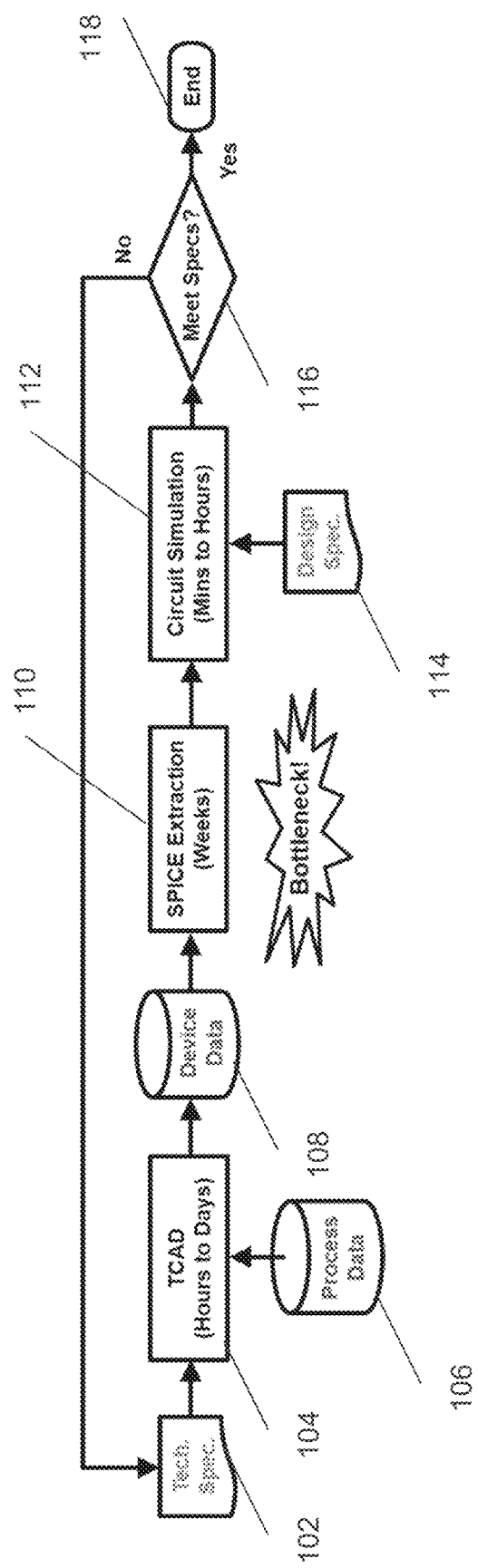
FIG. 1 illustrates a conventional method of design and technology interaction.

Methods and systems are provided for circuit design process and manufacturing technology process co-optimization. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

For submicron manufacturing process technology, parallel circuit design process and manufacturing technology process optimization (PDTO) has become an indispensable process for the semiconductor foundries to deliver their advanced logic nodes or to serve as a pathfinder for the novel device structures. PDTO may contribute greater than 40% of gate density gain in a 5 nm node. PDTO is necessary when an old device structure is to be replaced, or when major changes are introduced to enhance the performance of a device. It is predicted that fin field-effect transistors (FinFET) will continue to be the dominant device structure while a gradual takeover of lateral gate-all-around (GAA) may take place in the near future. Eventually 3D memory-on-logic integration may take the baton to achieve higher density. Besides using higher and thinner fins for a larger effective width to enhance drive per footprint, other performance boosters may include using strained Si channel (NMOS) and SiGe channel (PMOS) on top of strain relaxation buffer (SRB) to increase mobility, and reducing source/drain series resistance by utilizing metal-insulator-semiconductor (MIS) contacts or using Cobalt (Co) instead of Tungsten (W) as the contact metal. With this perspective of Moore's law, PDTO plays a critical role in the pursuit of next-generation device integration.

A method of parallel design and technology optimization is presented. According to aspects of the present disclosure, two independently operable manufacturing technology process and circuit design process are linked by a baseline SPICE model from the manufacturing process to a technology specification window in the circuit design process, and by a feedback of an updated technology specification from the circuit design process to the technology specification in the manufacturing process. In some applications, the disclosed PDTO methodology can be applied in closely integrated departments within a logic or memory (DRAM or flash) integrated design manufacturer (IDM) company. In other applications, the disclosed PDTO methodology can be applied in vertically integrated teams of the same company or in two closely integrated teams from different companies. In addition, an automated specification driven extraction flow (SDEF) can reduce the device model development cycle time in baseline model and retargeted model extraction.

Figure 2:
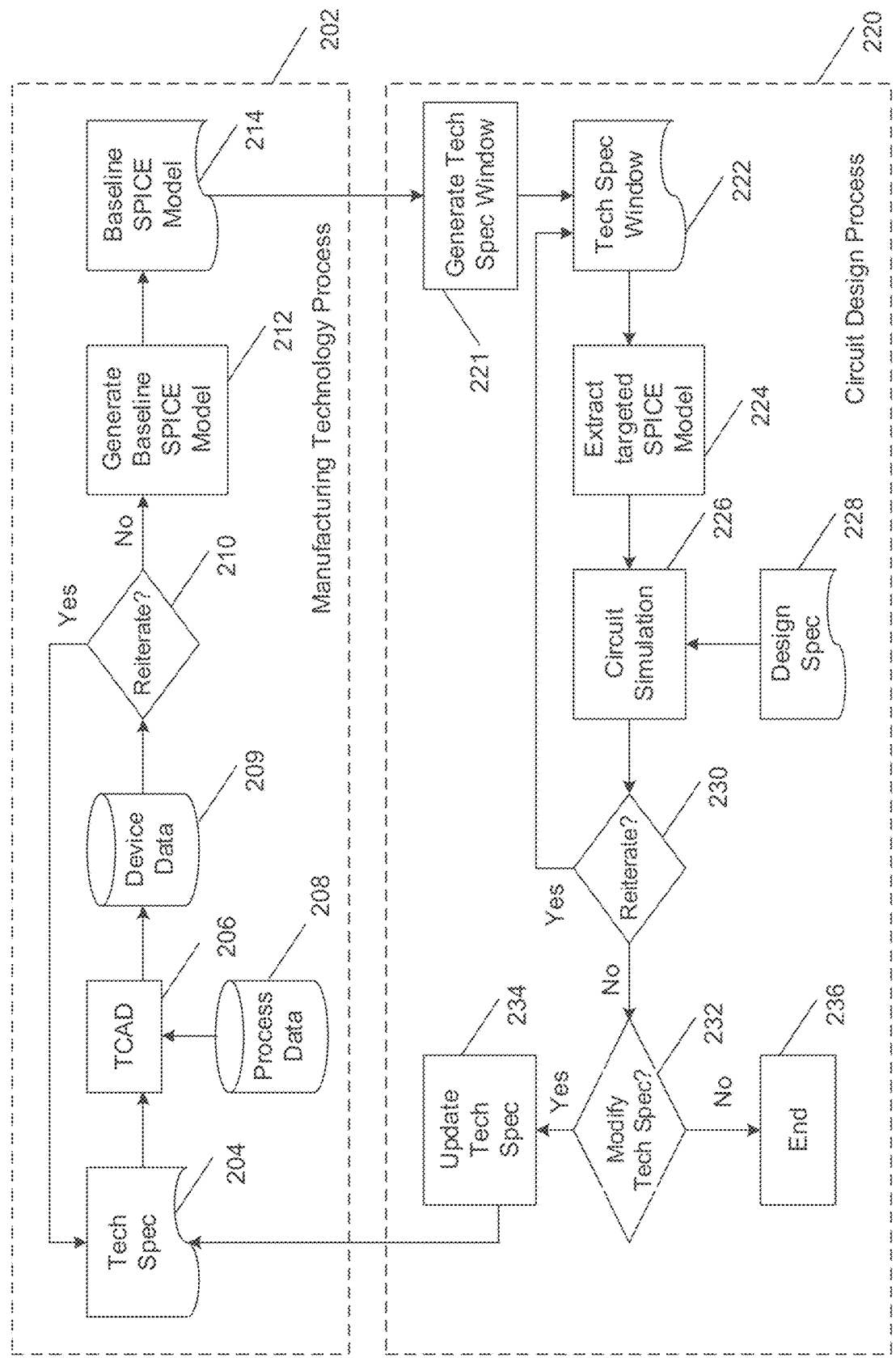
FIG. 2 illustrates an exemplary implementation of parallel circuit design process and manufacturing technology process optimization according to embodiments of the present disclosure.

FIG. 2 illustrates an exemplary implementation of parallel circuit design process and manufacturing technology process optimization according to embodiments of the present disclosure. As shown in FIG. 2, the exemplary implementation includes a manufacturing technology process 202 and a circuit design process 220. The manufacturing technology process 202 is configured to focus on improving the manufacturing technology.

The manufacturing technology process 202 starts in block 204 where a technology specification is provided. The technology specifications are desired electrical qualifications of a technology. In block 206, a technology computer aided design (TCAD) tool uses the technology specification and process data 208 to generate device data 209. Process data are physical properties like oxide thickness, doping density, gate pitch, etc., and device data are I-V and C-V curves. In block 210, an inquiry is made as to whether the device data 209 meets desired criteria and whether there is a need to reiterate the manufacturing technology process. If there is a need to reiterate (210_Yes), the process moves back to block 204. If there is no need to reiterate, the process proceeds to block 212. In block 212, SPICE model extraction is performed using the device data 209 to generate a baseline SPICE model 214 to be provided to the circuit design process.

The circuit design process 220 starts in block 221 where the baseline SPICE model 214 received from the manufacturing technology process is extended to generate a corresponding description of technology specification window 222, where the technology specification window 222 describes extended ranges of device model parameters. In some implementations, extending the baseline SPICE model to a corresponding description of technology specification window includes identifying a set of device model parameters having key output (KOP) targets, identifying ranges of the key output targets based on variations of corresponding manufacturing parameters from the manufacturing technology process, and forming a plurality of combinations of key output targets, and generating the technology specification window using the plurality of combinations of key output targets. Generating the technology specification window includes performing tradeoffs among the plurality of combinations of key output targets to meet target criteria of the circuit by preventing overfitting of a particular key output target to achieve an overall outcome, and optimizing the set of device model parameters based on the target criteria of the circuit, where partially local optimization and partially global optimization may be performed on the set of device model parameters.

Note that the extended ranges of device model parameters may include, for each extended range of a device model parameter, a lower boundary of the device model parameter having a first value, an upper boundary of the device model parameter having a second value, where the lower boundary and the upper boundary have ranges of values independent of each other.

In block 224, the process extracts a targeted SPICE model 224 using the technology specification window 222. In some implementations, extracting the targeted SPICE model includes, for each device of the integrated circuit, provide a test data set associated with the device, where the test data set includes a plurality of test data obtained by testing the device under multiple sets of test conditions, and each set of test conditions includes combinations of multiple test conditions; provide extraction conditions, the extraction conditions include a plurality of extraction condition fields that corresponds to a test condition; receive a user selection of one or more extraction condition fields and corresponding extraction condition input variables; filtering the test data set to generate a targeted test data set base on the user selection; and generating parameters of the device by fitting the targeted SPICE model of the device with the targeted test data set. In block 226, the integrated circuit is simulated to verify whether the integrated circuit meets a design specification 228 using the targeted SPICE model 224. The design specification 228 includes criterions of circuit figure-of-merits (FOMs).

In block 230, a first inquiry is made whether the integrated circuit being designed meets the design specification 228 and whether there is a need to reiterate the circuit design process. If there is a need to reiterate (230_Yes), the process moves back to block 222. If there is no need to reiterate (230_No), the process proceeds to block 232. In block 232, a second inquiry is made whether to provide input to modify the technology specification 204. If there is a need to modify the technology specification 204 (232_Yes), the process moves to block 234. If there is no need to modify the technology specification 204 (232_No), the process ends in block 236.

In block 234, the circuit design process provides updates to the technology specification 204 to be used in the manufacturing technology process. According to aspects of the present disclosure, there are at least two ways the circuit design process can provide feedback to the manufacturing process. In situations where the integrated circuit meets the design specification, information about the model devices and their corresponding parameters obtained in the targeted SPICE model may be provided to the manufacturing technology process for future fine tuning and improvement. In situations where the integrated circuit does not meet the design specification, information about proposed changes to the model devices and their corresponding parameters may be provided to reiterate the manufacturing technology process to produce an updated baseline SPICE model for use in the circuit design process.

According to aspects of the present disclosure, the baseline SPICE model can be derived from TCAD data. In this example, a baseline FinFET model of NFIN=3 and Lg=18 nm is used to demonstrate the proposed flow. Other example process specifics of the baseline model are listed in Table 1(a) according to a summary of 5 nm nodes. Examples of key output (KOP) definitions for Idsat (or Ion), Idoff (or Ioff), Idlin, Idh, Idl, and Idmid are shown in Table 1(b).

TABLE 1(a) and TABLE 1(b)

(a)

| | |
|---|---|
| Vdd | 0.7 V |
| EOT | 1.1 nm |
| Gate Length | 18 nm |
| Gate Pitch | 48 nm |
| Fin Height | 50 nm |
| Fin Width | 7 nm |
| Fin Pitch | 28 nm |

(b)

| | Vd | Vg |
|---|---|---|
| Idsat | Vdd | Vdd |
| Idoff | Vdd | 0 V |
| Idlin | 0.05 V | Vdd |
| Idh | 0.5 Vdd | Vdd |
| Idl | Vdd | 0.5 Vdd |
| Idmid | 0.5 Vdd | 0.5 Vdd |

Figures 3A, 3B:
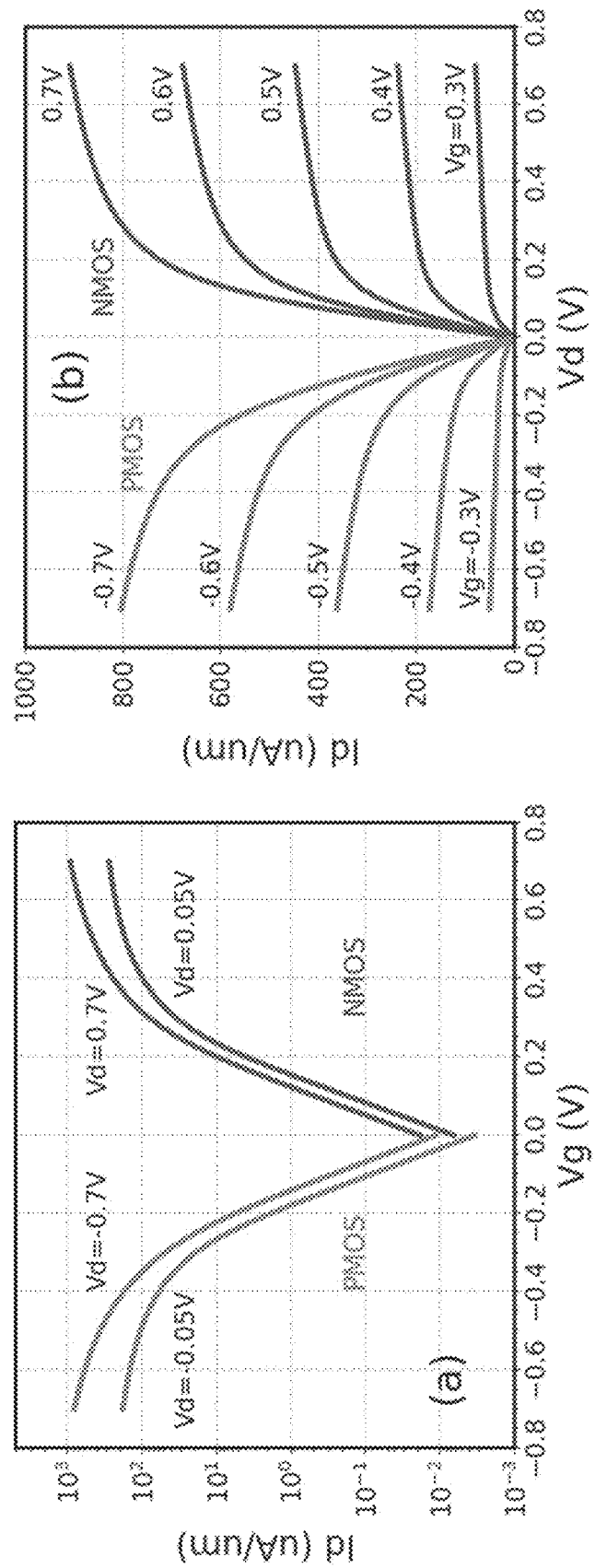
FIG. 3A illustrates exemplary input characteristics of a baseline FinFET model according to aspects of the present disclosure.
FIG. 3B illustrates exemplary output characteristics of the baseline FinFET model of FIG. 3A according to aspects of the present disclosure.

FIG. 3A illustrates exemplary input characteristics of a baseline FinFET model according to aspects of the present disclosure. FIG. 3B illustrates exemplary output characteristics of the baseline FinFET model of FIG. 3A according to aspects of the present disclosure. In FIG. 3A, input (Id-Vg) characteristics of both NMOS and PMOS are shown in FIG. 3A, with examples of Vd equals 0.05V and 0.7V respectively, where Id is normalized to Weff. In FIG. 3B, output (Id-Vd) characteristics of both NMOS and PMOS are shown in FIG. 3B, with Vg having a range from 0.3V to 0.7V. Examples of the key outputs (KOPs) of the baseline models are listed below.

| (C) | DIBL (mV/V) | SS (mV/dec) | Idsat (uA/um) | Idoff (nA/um) | Idlin (uA/um) | Idh (uA/um) | Idl (uA/um) | Idmid (uA/um) |
|---|---|---|---|---|---|---|---|---|
| NMOS | 45.7 | 73.5 | 908 | 18 | 272 | 830 | 149 | 127 |
| PMOS | 58.6 | 75.2 | 803 | 11 | 178 | 704 | 100 | 79 |

Figure 3E:
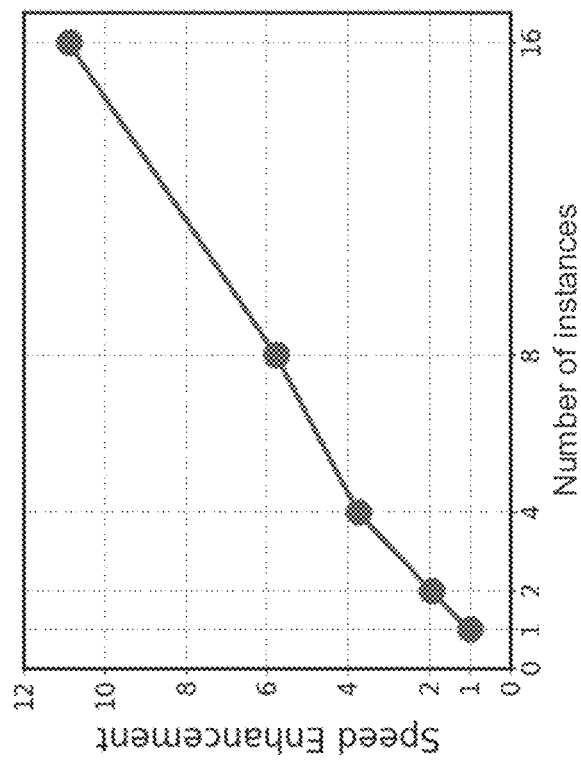
FIG. 3E illustrates a comparison of performance enhancement versus number of device instances according to aspects of the present disclosure.
Figure 3C:
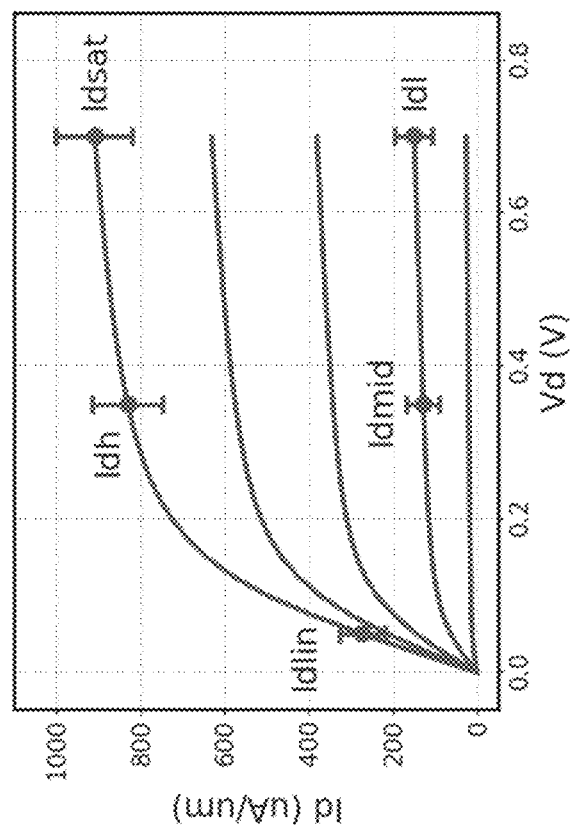
FIG. 3C illustrates an exemplary method of using a specification window according to aspects of the present disclosure.

According to aspects of the present disclosure, a technology specification window describes the allowed ranges of each KOP by acceptable variation of manufacture-able parameters from TCAD. FIG. 3C illustrates an exemplary method of using a specification window with allowed ranges of KOPs according to aspects of the present disclosure. In FIG. 3C, it is shown that a ±10% window for Idh and Idsat, ±20% window for Idlin, and ±30% window for Idmid and Idl. Note that the upper boundary and lower boundary of the technology specification window can be varied independent of each other. Within the technology specification window, various combinations of KOP targets can be formed and fed into SDEF to extract SPICE models. These extracted SPICE models can then be used in the circuit design process to check whether an integrated circuit meets its design specification. If the integrated circuit does not meet its design specification, those device models that are used to create the unqualified integrated circuit are singled out, and can be fed back to the manufacturing technology process team to refine the window size (for example by reducing process variation). If a major technology update is introduced, an updated baseline SPICE model may be extracted to produce an updated technology specification window. The baseline SPICE model and the technology specification window can be used as the mutual language between manufacturing technology process and circuit design process. With the technology specification window created, circuit designers can shorten the design cycle using a specification driven extraction flow (SDEF) described below.

According to aspects of the present disclosure, after the baseline SPICE model and the technology specification window are in place, extracting a targeted SPICE model (block 224) may employ the method of SDEF as a trial model generator in the circuit design process. In some applications, high quality targeted SPICE models can be generated with a faster turnaround time. The targeted SPICE models can be used repeatedly, and their quality is not susceptible to inconsistent approaches adopted by different design engineers. In addition, SDEF can be reconfigurable with an API library to choose from. With this approach, the model know-how and standard operating procedure of model extraction can be preserved in SDEF, and can be improved overtime from project to project without the negative impact of engineer turnover.

Figure 3D:
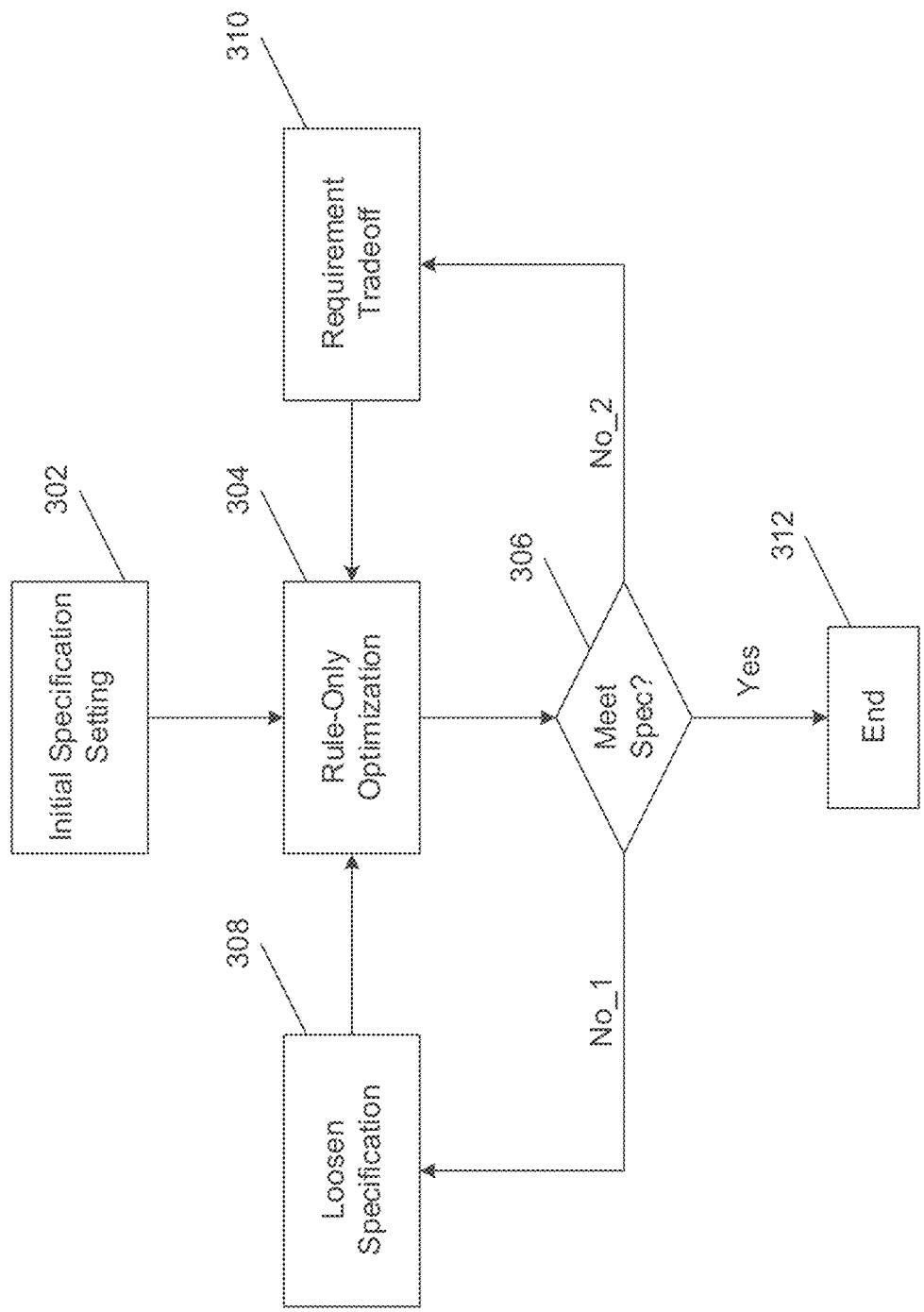
FIG. 3D illustrates an exemplary implementation of a specification driven extraction flow according to aspects of the present disclosure.

FIG. 3D illustrates an exemplary implementation of a specification driven extraction flow according to aspects of the present disclosure. In the example shown in FIG. 3D, an exemplary automated extraction flow that can be employed to achieve production level performance and quality. The SDEF depicted in FIG. 3D is specification driven in nature with the goal of meeting all specifications including fitting/target criterions and/or quality assurance (QA) rules simultaneously. Not only does the specification provide a quantifiable, thus optimizable, criterion for model extraction.

As shown in FIG. 3D, the exemplary SDEF starts in block 302 with initial specification settings, thereafter it moves to block 304. In block 304, the SDEF performs rule-only optimization. Note that the rule-only optimization can be configured to prevent overfitting a particular curve or KOP in the pursuit of the optimal results. In block 306, the SDEF checks whether the model specifications are met on the fly and determines the next step. If the model specifications are not met, the SDEF may perform a first option (306_No_1) of moving to block 308, where the SDEF may loosen the specification and then move back to block 304. If the model specifications are not met, the SDEF may perform a second option (306_No_2) of moving to block 310, where the SDEF may perform requirement tradeoff according to user's input and then move back to block 304. If the model specifications are met (306_Yes), the SDEF ends in block 312. Note that other features of SDEF may include parameter boundary and trend control, parameter smoothing, hybrid (partially global, partially local) parameter optimization, KOP trend prediction for device size without silicon data to extract accurate bin model, QA checking, etc.

In some implementations, the performance can be further enhanced by parallelization. FIG. 3E illustrates a comparison of performance enhancement versus number of device instances according to aspects of the present disclosure. In FIG. 3E, the speed enhancement vs. number of parallel SDEF running on multiple 2.10-GHz CPU (4-core), 8G RAM, 64-bit Windows PCs are shown. Two instances of modeled devices are activated on each PC to run the same flow. In this example, the enhancement is quite linear before 4 instances. An eleven times enhancement can be reached using 16 instances. The parallelization can be especially useful when there are a large number device sizes to be extracted in an accurate bin model.

In some implementations, a specification driven extraction platform in a modeled device can be equipped with analysis tools for device-circuit co-optimization. Device KOPs vs. parameter sensitivity can be checked without having prior knowledge of a model. Circuit FOMs vs. device KOPs allows circuit designers to search for the most correlated KOP and use it to optimize technology specification using the technology specification window.

Figure 4A:
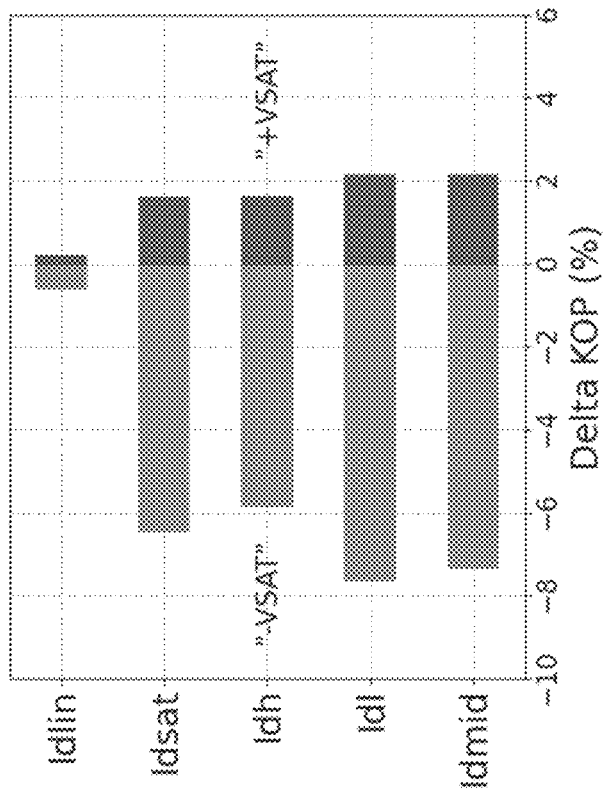
FIG. 4A illustrates examples of key output sensitivity with respect to variations of a circuit parameter according to aspects of the present disclosure.
Figure 4B:
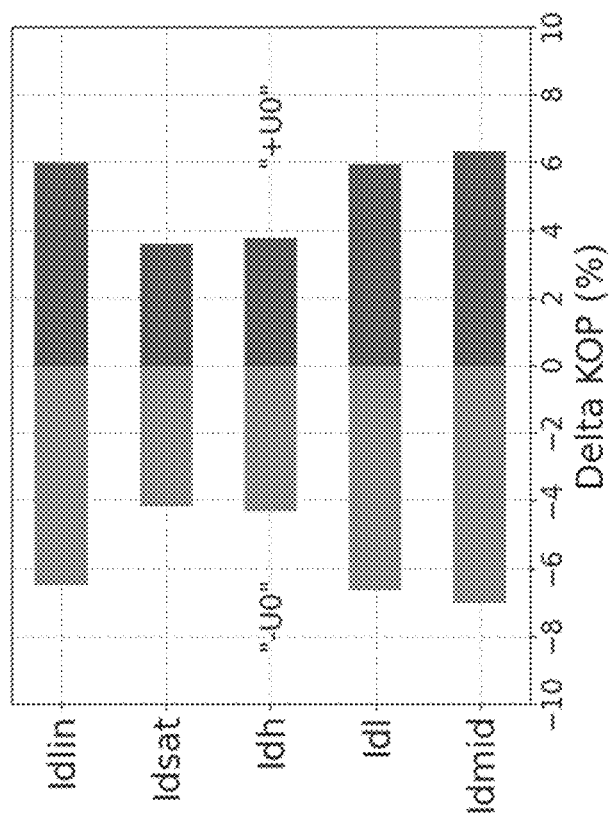
FIG. 4B illustrates other examples of key output sensitivity with respect to variations of another circuit parameter according to aspects of the present disclosure.
Figure 4D:
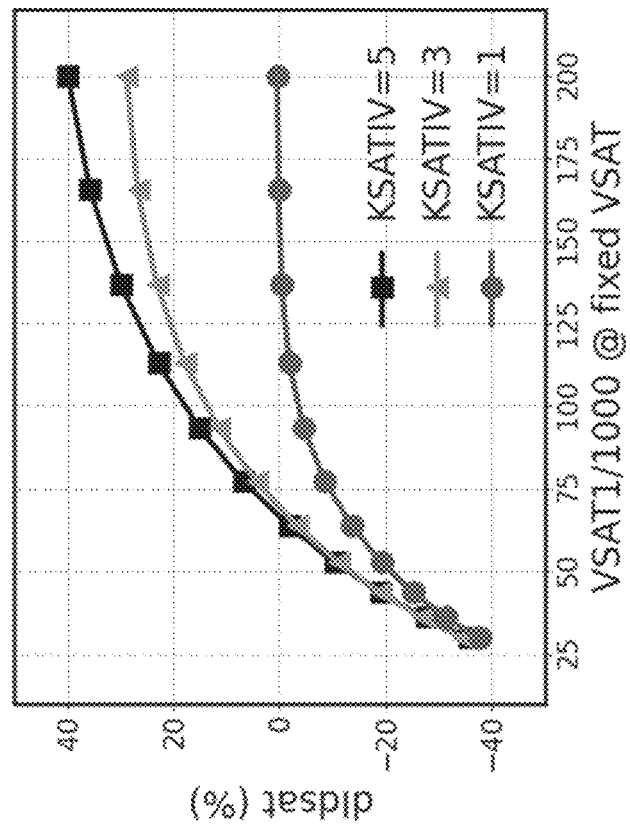
FIG. 4D illustrates various examples of Idsat vs VSAT1 according to aspects of the present disclosure.
Figure 4C:
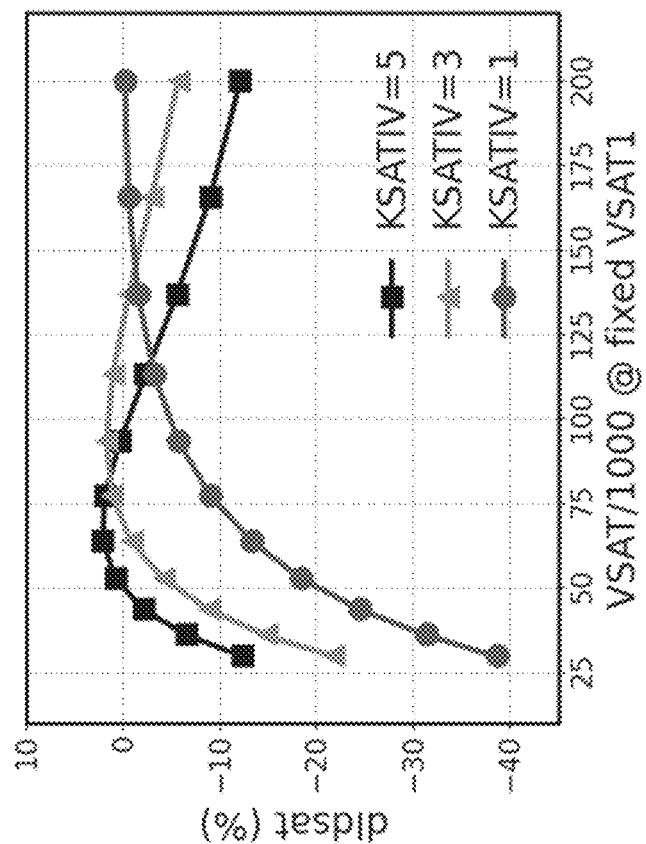
FIG. 4C illustrates various examples of Idsat vs VSAT according to aspects of the present disclosure.

FIG. 4A illustrates examples of key output sensitivity with respect to variations of a circuit parameter according to aspects of the present disclosure. FIG. 4B illustrates other examples of key output sensitivity with respect to variations of another circuit parameter according to aspects of the present disclosure. In the example of FIG. 4A, the KOP sensitivity is shown by varying ±10% of U0 (low-field mobility). The KOP shift (in %) may be symmetric across the reference point with a stronger sensitivity for KOPs in the linear region (Idlin) or near-subthreshold region (Idmid, Idl). On the other hand, in the example of FIG. 4B, by varying ±30% of VSAT (saturation velocity), the KOP sensitivity may be tilted heavily toward the minus VSAT side and shows a very different sensitivity between Idlin vs. others. Note that channel length may also play an important factor in parameter sensitivity. In FIG. 4A and FIG. 4B, Lg=18 nm is used as an example. In one approach, there exists a parameter VSAT1 (saturation velocity for the linear region) besides the commonly known VSAT (saturation velocity for the saturation region). FIG. 4C illustrates various examples of Idsat vs VSAT with various KSATIV according to aspects of the present disclosure. FIG. 4D illustrates various examples of Idsat vs VSAT1 with various KSATIV according to aspects of the present disclosure. In FIG. 4C, it is shown that at higher KSATIV values, dIdsat tends to saturate at smaller VSAT and then having a negative Idsat sensitivity. FIG. 4D shows a result that by varying VSAT1, not VSAT, a positive Idsat sensitivity can be ensured despite KSATIV values. The sensitivity analysis can be helpful for model engineers to pick appropriate parameters for a typical model, reserving some margin for corner models (FF/SS). It can also be used as a checking tool for model quality assurance (QA) if issues are found in the corner model.

Figure 5B:
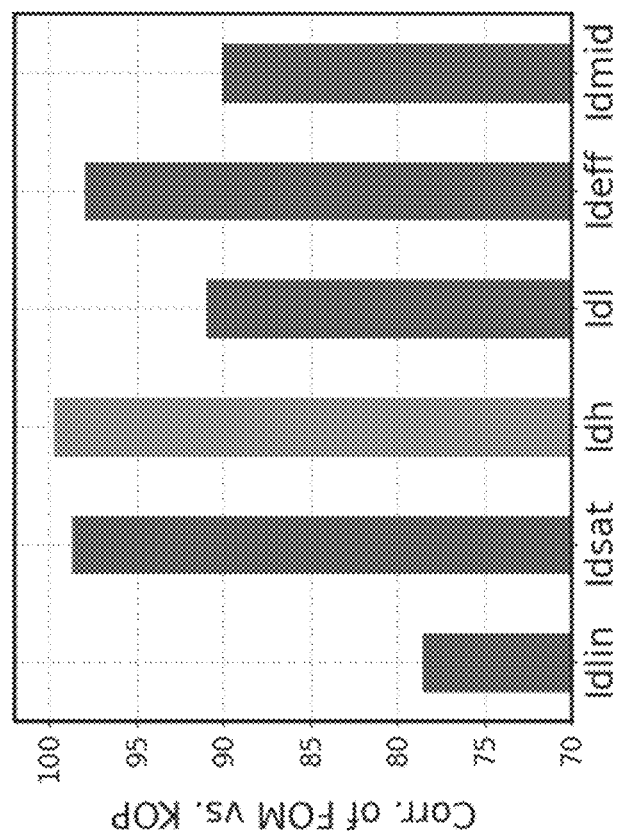
FIG. 5B illustrates a plot of examples of correlation of oscillation frequency versus key outputs according to aspects of the present disclosure.
Figure 5A:
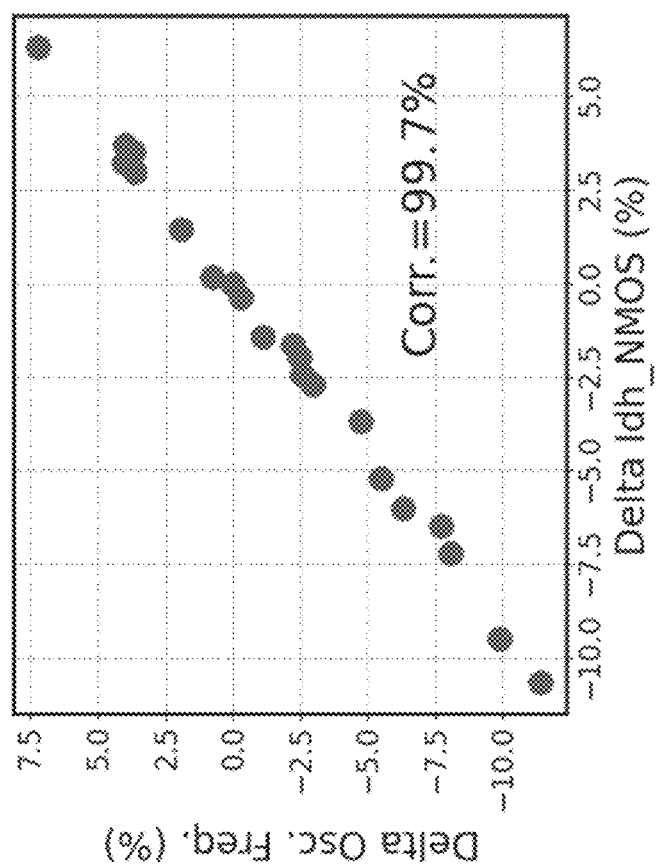
FIG. 5A illustrates a plot of oscillation frequency of a ring oscillator versus Idh according to aspects of the present disclosure.
Figure 5D:
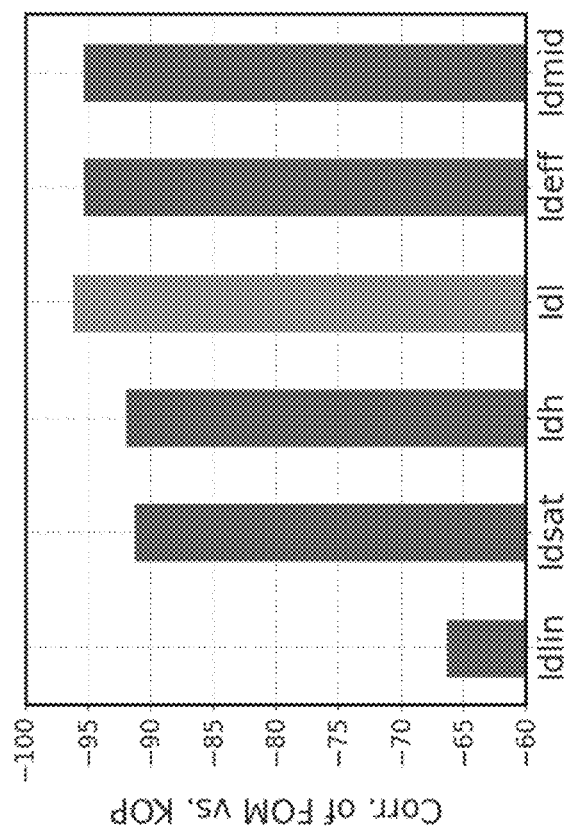
FIG. 5D illustrates examples of correlations of static noise margin versus device key outputs according to aspects of the present disclosure.
Figure 5C:
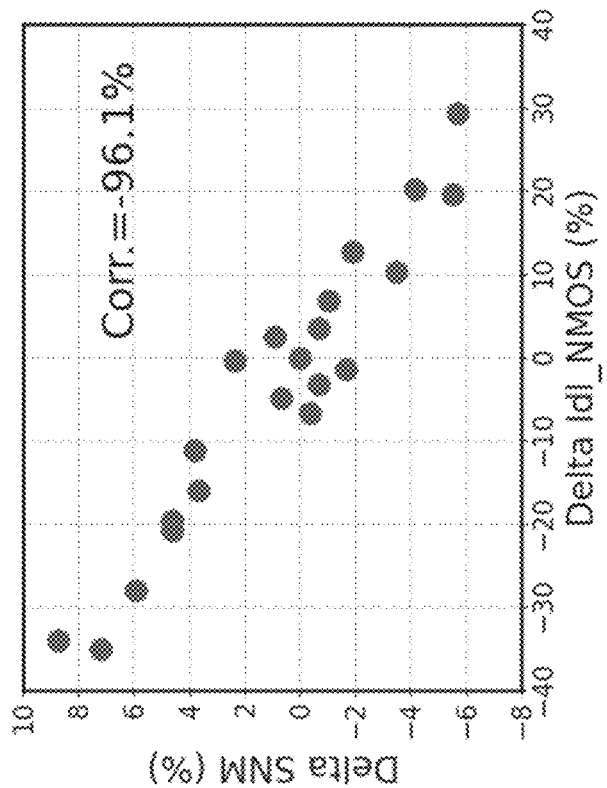
FIG. 5C illustrates a plot of static noise margin versus Idl according to aspects of the present disclosure.
Figure 5E:
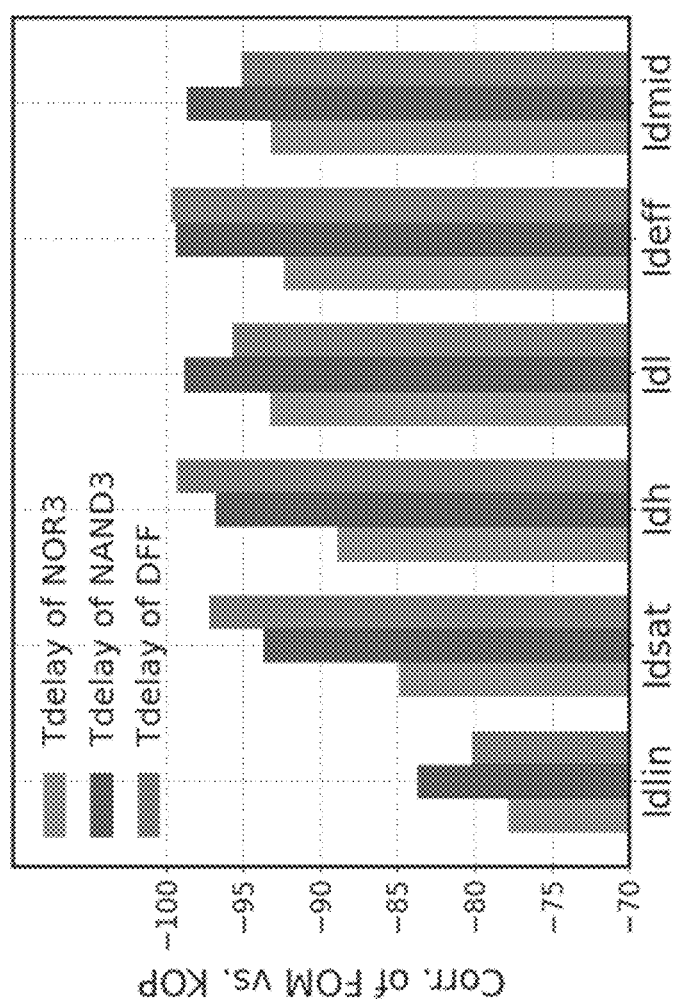
FIG. 5E illustrates examples of correlations of time delay versus device key outputs according to aspects of the present disclosure.

FIG. 5A illustrates a plot of oscillation frequency of a ring oscillator versus Idh according to aspects of the present disclosure. FIG. 5B illustrates a plot of examples of correlation of oscillation frequency versus key outputs according to aspects of the present disclosure. FIG. 5C illustrates a plot of static noise margin versus Idl according to aspects of the present disclosure. FIG. 5D illustrates examples of correlations of static noise margin versus device key outputs according to aspects of the present disclosure. FIG. 5E illustrates examples of correlations of time delay versus device key outputs according to aspects of the present disclosure.

In FIG. 5A, a scatter plot of oscillation frequency of a 3-stage ring oscillator vs. Idh of NMOS is shown. It is found that Idh has the highest correlation (99.7%) among all KOPs (as shown in FIG. 5B). In FIG. 5C, a scatter plot of static noise margin (SNM) of a 6T SRAM vs. Idl of NMOS is shown. The highest correlation (−96.1%) of Idl is comparable to both Ideff (half of the sum of Idh and Idl) and Idmid (as shown in FIG. 5D). In FIG. 5E, the correlation of standard cell time delay vs. KOPs including a 3-input NOR gate (NOR3), a 3-input NAND gate (NAND3), and a D-flip flop (DFF) is shown. Results show that time delay of NOR3 may be most sensitive to Idl while both NAND3 and DFF may be most sensitive to Ideff.

Figure 6:
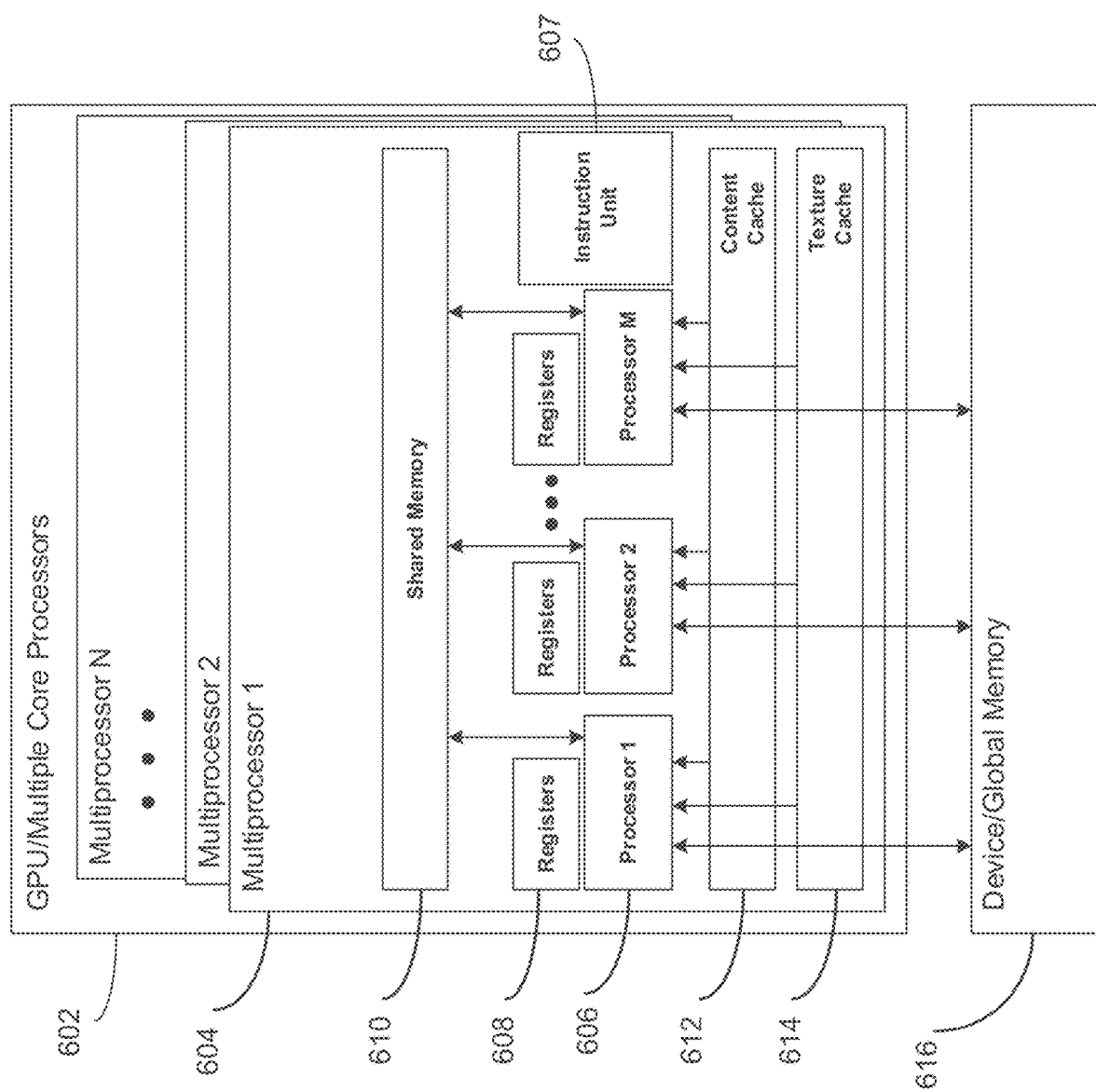
FIG. 6 illustrates an exemplary architecture of a multiple core processor unit according to some aspects of the present disclosure.

FIG. 6 illustrates an exemplary architecture of a multiple core processor (or graphics processor) unit according to some aspects of the present disclosure. As shown in FIG. 6, each GPU 602 includes N multiprocessors. Each multiprocessor 604 further includes M processors 606 and an instruction unit 607. Each processor has its own registers 608. All the processors 606 in one multiprocessor 604 share a block of shared memory 610. All the processors share the same set of constant cache 612 and texture cache 614 memories. They can also access the data in device memory 616, which is also referred to as the global memory.

In this example, each multiprocessor 604 has a block of shared memory. Accessing data from the shared memory 610 is much faster than accessing data from the device (global) memory 616. For this reason, one approach to increase computational efficiency is to load the data from the global memory 616 to the shared memory 610, perform much of the computations/manipulations using the shared memory 610, and then write back the results from the shared memory 610 to the global memory 616.

Figure 7:
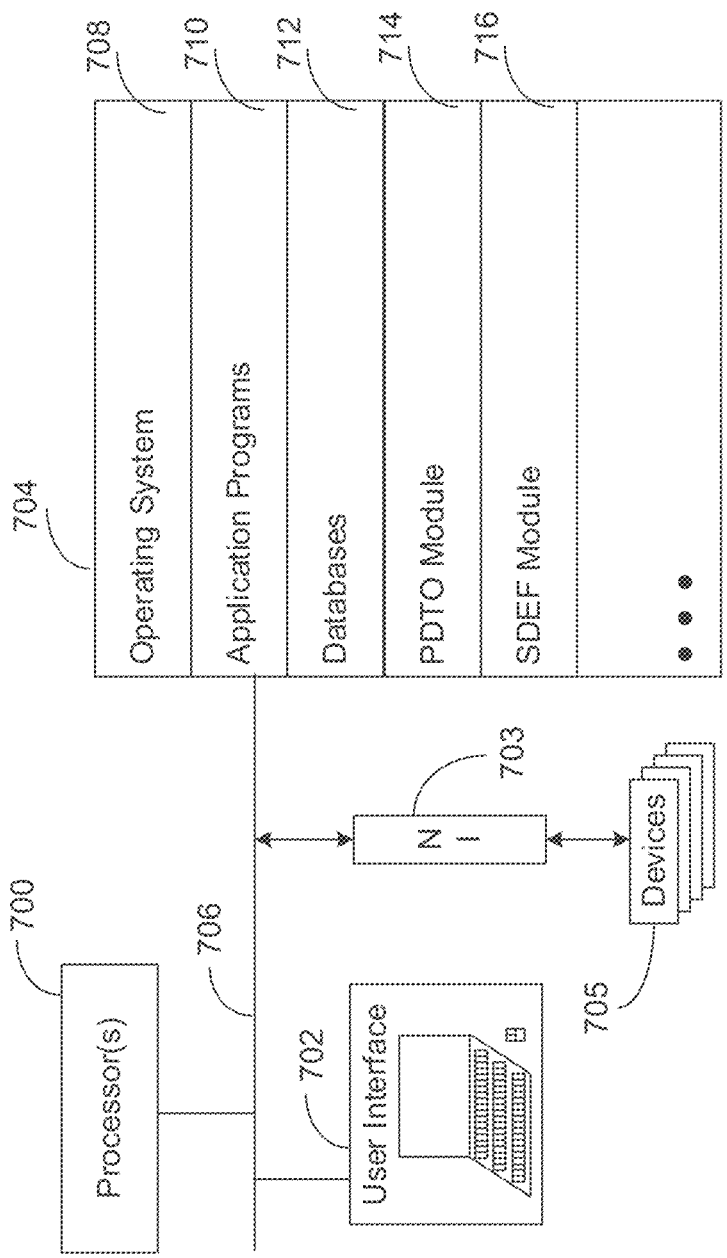
FIG. 7 illustrates a system for implementing methods of circuit design process and manufacturing technology process co-optimization according to an embodiment of the present disclosure.

FIG. 7 illustrates a system for implementing methods of circuit design process and manufacturing technology process co-optimization in parallel according to an embodiment of the present disclosure. In one embodiment, the methods for conducting circuit design process and manufacturing technology process co-optimization may be implemented using a computer system. The computer system may include one or more graphics processing units (GPUs) and/or central processing units (CPUs) 700 (hereinafter referred to as processor(s) for short), at least a user interface 702 for displaying computation results and waveforms, a memory device 704, a system bus 706, and one or more bus interfaces for connecting the GPUs/CPUs, user interface, memory device, and system bus together. The computer system also includes at least one network interface 703 for communicating with other devices 705 on a computer network. In alternative embodiments, certain functionalities of the method and system may be implemented in one or more application-specific integrated circuits (ASICs) or field-programmable gate arrays (FPGAs), thereby reducing the role of the GPU/CPU.

The memory device 704 may include high-speed random-access memory and may also include non-volatile memory, such as one or more magnetic disk storage devices. The memory device may also include mass storage that is located remotely from the GPUs/CPUs. The memory device preferably stores:

an operating system 708 that includes procedures for handling various basic system services and for performing hardware-dependent tasks;
application programs 710 for performing other user-defined applications and tasks, such as circuit simulations and device evaluations;
databases 712 for storing information of the integrated circuit, the databases include data structures, device models, and matrices;
PDTO module 714 configured to perform parallel design and technology optimization as described in the disclosure;
SDEF module 716 configured to perform specification driven extraction flow as described in the disclosure.

The databases, the application programs, and the program for implementing methods of parallel design and technology optimization or specification driven extraction flow may include executable procedures, sub-modules, tables, and other data structures. In other embodiments, additional or different modules and data structures may be used, and some of the modules and/or data structures listed above may not be used.

Figure 8A:
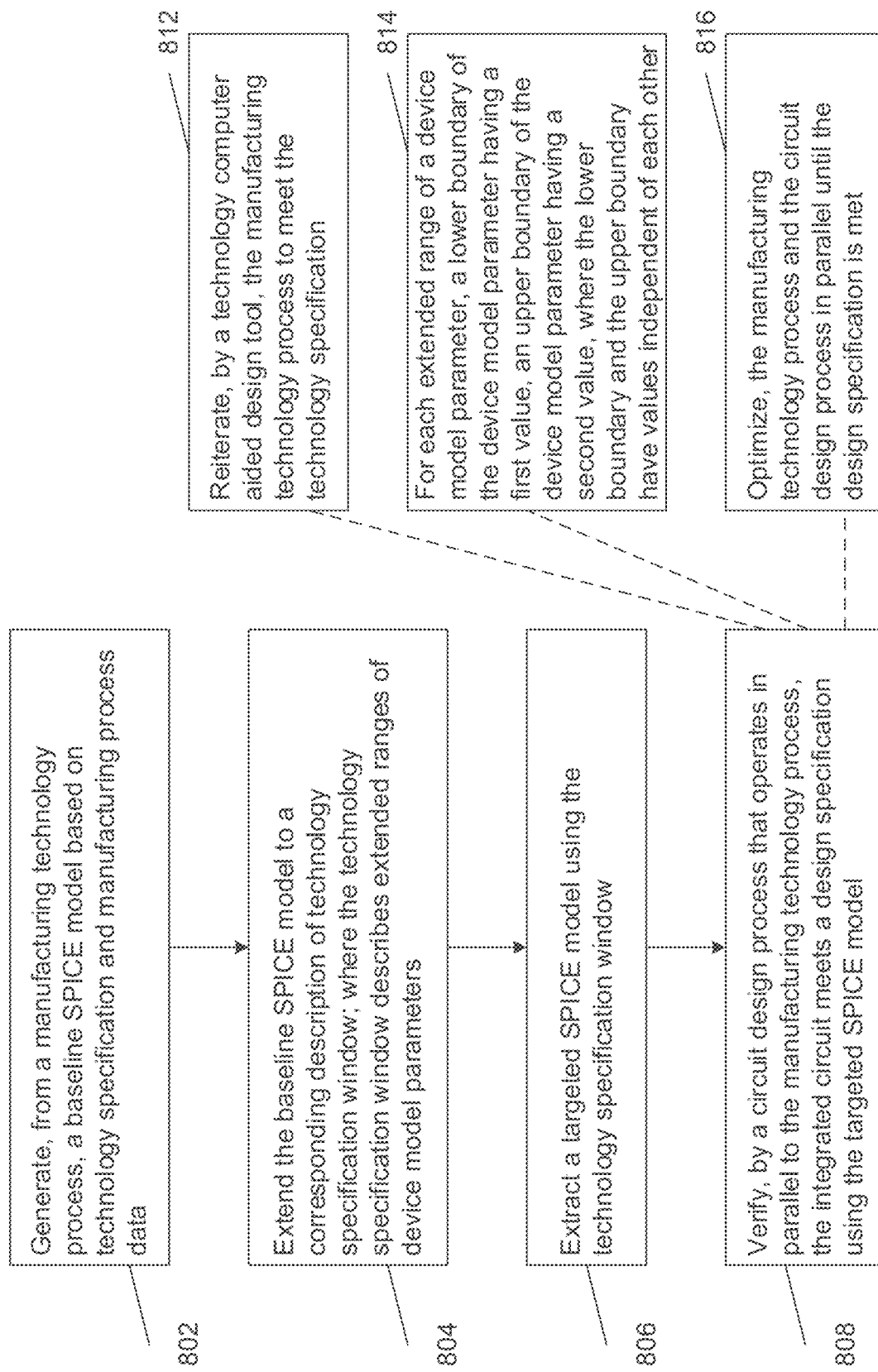
FIG. 8A illustrates an exemplary implementation of parallel design and technology optimization according to aspects of the present disclosure.

FIG. 8A illustrates an exemplary implementation of parallel design and technology optimization according to aspects of the present disclosure. As shown in FIG. 8A, in block 802, the method generates, from a manufacturing technology process, a baseline SPICE model based on technology specification and manufacturing process data. In block 804, the method extends the baseline SPICE model to a corresponding description of technology specification window, where the technology specification window describes extended ranges of device model parameters. In block 806, the method extracts a targeted SPICE model using the technology specification window. In block 808, the method verifies, by a circuit design process that operates in parallel to the manufacturing technology process, the integrated circuit meets a design specification using the targeted SPICE model.

According to aspects of the present disclosure, the methods performed in blocks 802 through 808 may optionally and/or additionally include the methods performed in blocks 812, 814, or 816. In block 812, the method reiterates, by a technology computer aided design tool, the manufacturing technology process to meet the technology specification. In block 814, the method describes the extended ranges of device model parameters. For example, for each extended range of a device model parameter, a lower boundary of the device model parameter has a first value, an upper boundary of the device model parameter has a second value, where the lower boundary and the upper boundary have ranges of values independent of each other. In block 816, the method optimizes the manufacturing technology process and the circuit design process in parallel until the design specification is met.

Figure 8B:
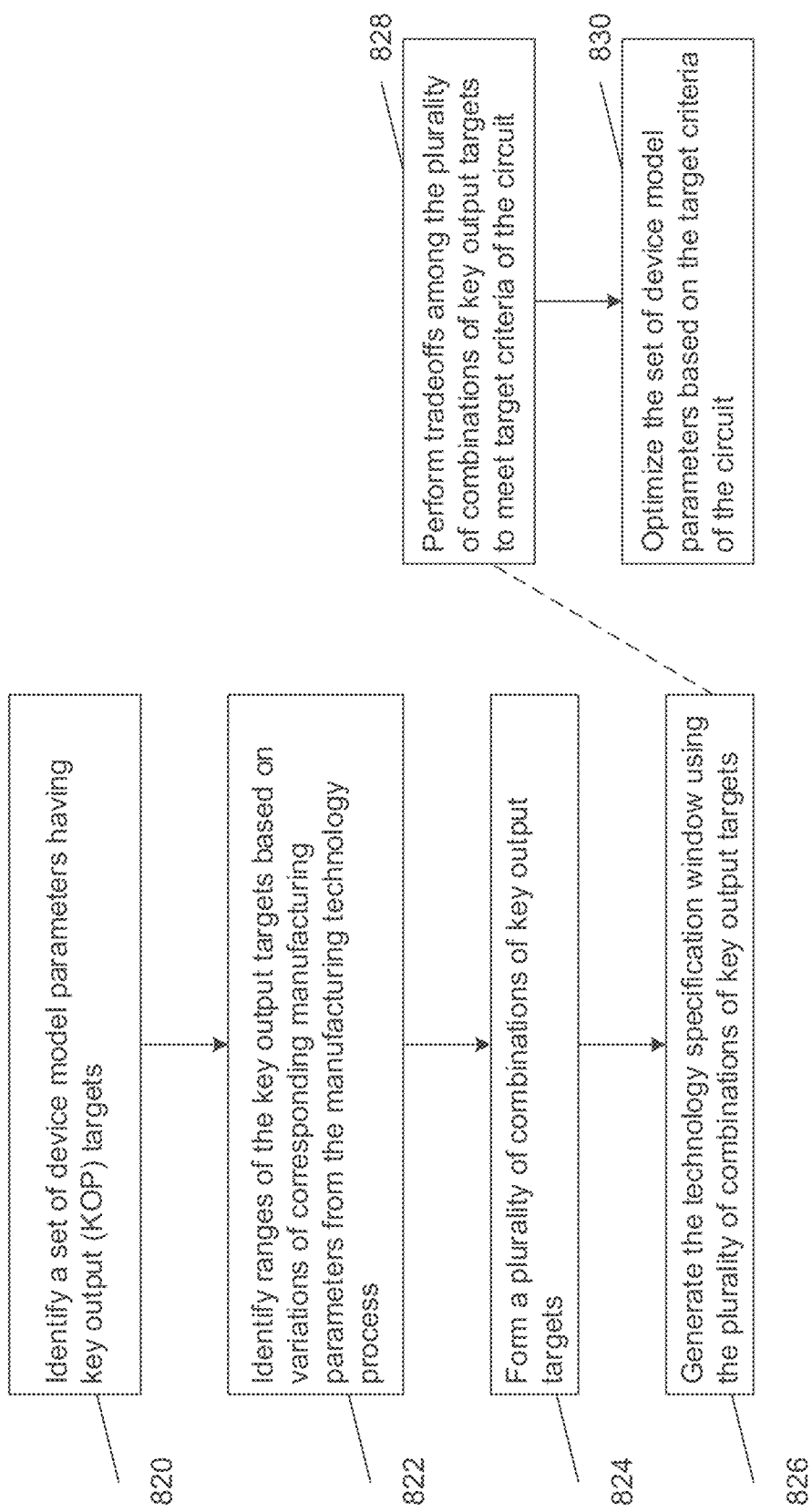
FIG. 8B illustrates an exemplary implementation of generating a technology specification window according to aspects of the present disclosure.

FIG. 8B illustrates an exemplary implementation of generating a technology specification window according to aspects of the present disclosure. In the example shown in FIG. 8B, in block 820, the method identifies a set of device model parameters having key output (KOP) targets. In block 822, the method identifies ranges of the key output targets based on variations of corresponding manufacturing parameters from the manufacturing technology process. In block 824, the method forms a plurality of combinations of key output targets. In block 826, the method generates the technology specification window using the plurality of combinations of key output targets.

According to aspects of the present disclosure, the methods performed in blocks 820 through 826 may optionally and/or additionally include the methods performed in blocks 828 and 830. In block 828, the method performs tradeoffs among the plurality of combinations of key output targets to meet target criteria of the circuit. In block 830, the method optimizes the set of device model parameters based on the target criteria of the circuit. In some implementations, performing tradeoffs includes preventing overfitting of a particular key output target to achieve an overall outcome, and optimizing the set of device model parameters includes performing partially local optimization and partially global optimization on the set of device model parameters.

Figure 8C:
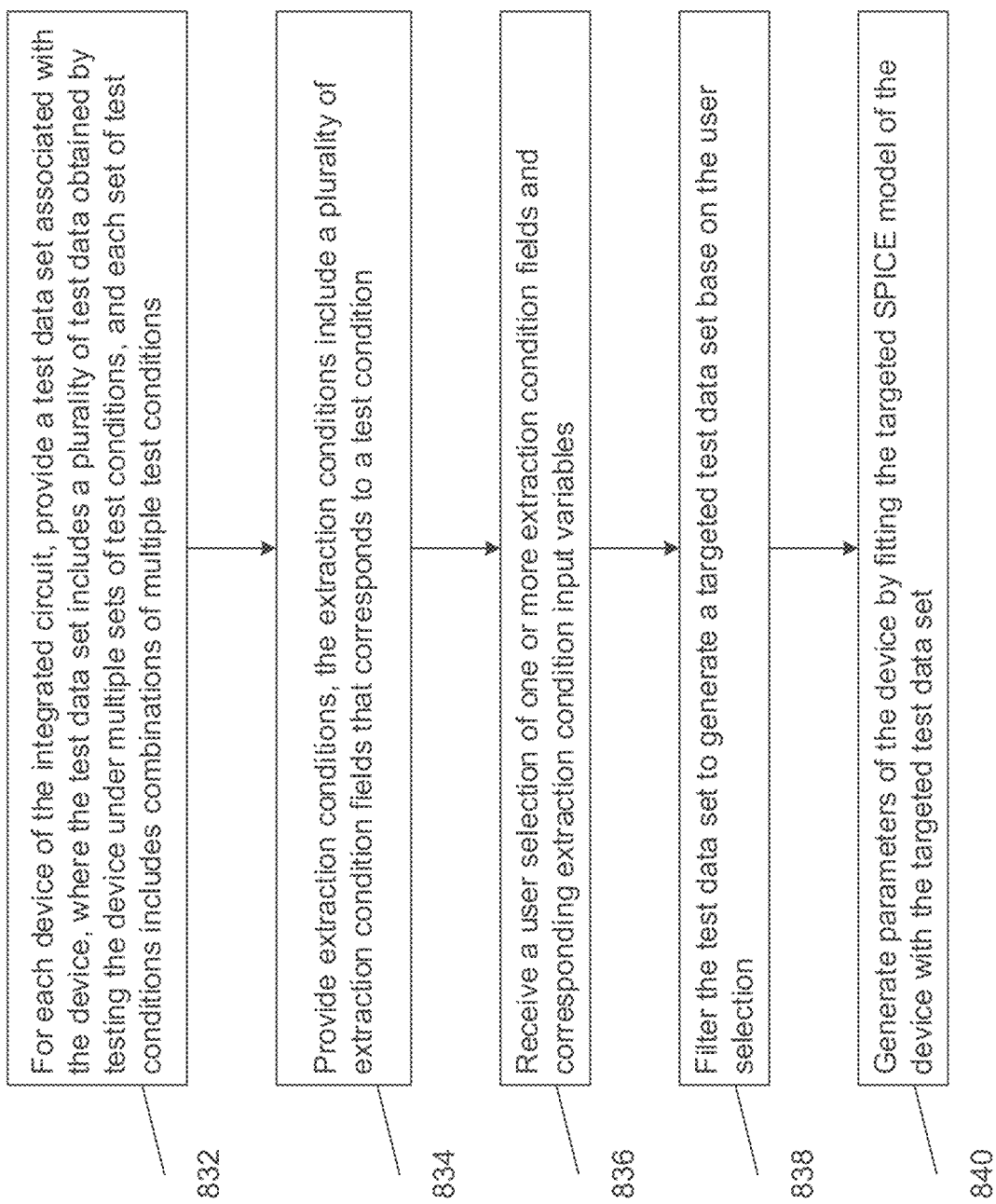
FIG. 8C illustrates an exemplary implementation of extracting a targeted SPICE model according to aspects of the present disclosure.

FIG. 8C illustrates an exemplary implementation of extracting a targeted SPICE model according to aspects of the present disclosure. As shown in FIG. 8C, in block 832, for each device of an integrated circuit, the method provides a test data set associated with the device, where the test data set includes a plurality of test data obtained by testing the device under multiple sets of test conditions, and each set of test conditions includes combinations of multiple test conditions. In block 834, the method provides extraction conditions, the extraction conditions include a plurality of extraction condition fields that corresponds to a test condition. In block 836, the method receives a user selection of one or more extraction condition fields and corresponding extraction condition input variables. In block 838, the method filters the test data set to generate a targeted test data set base on the user selection. In block 840, the method generates parameters of the device by fitting the targeted SPICE model of the device with the targeted test data set.

Figure 8D:
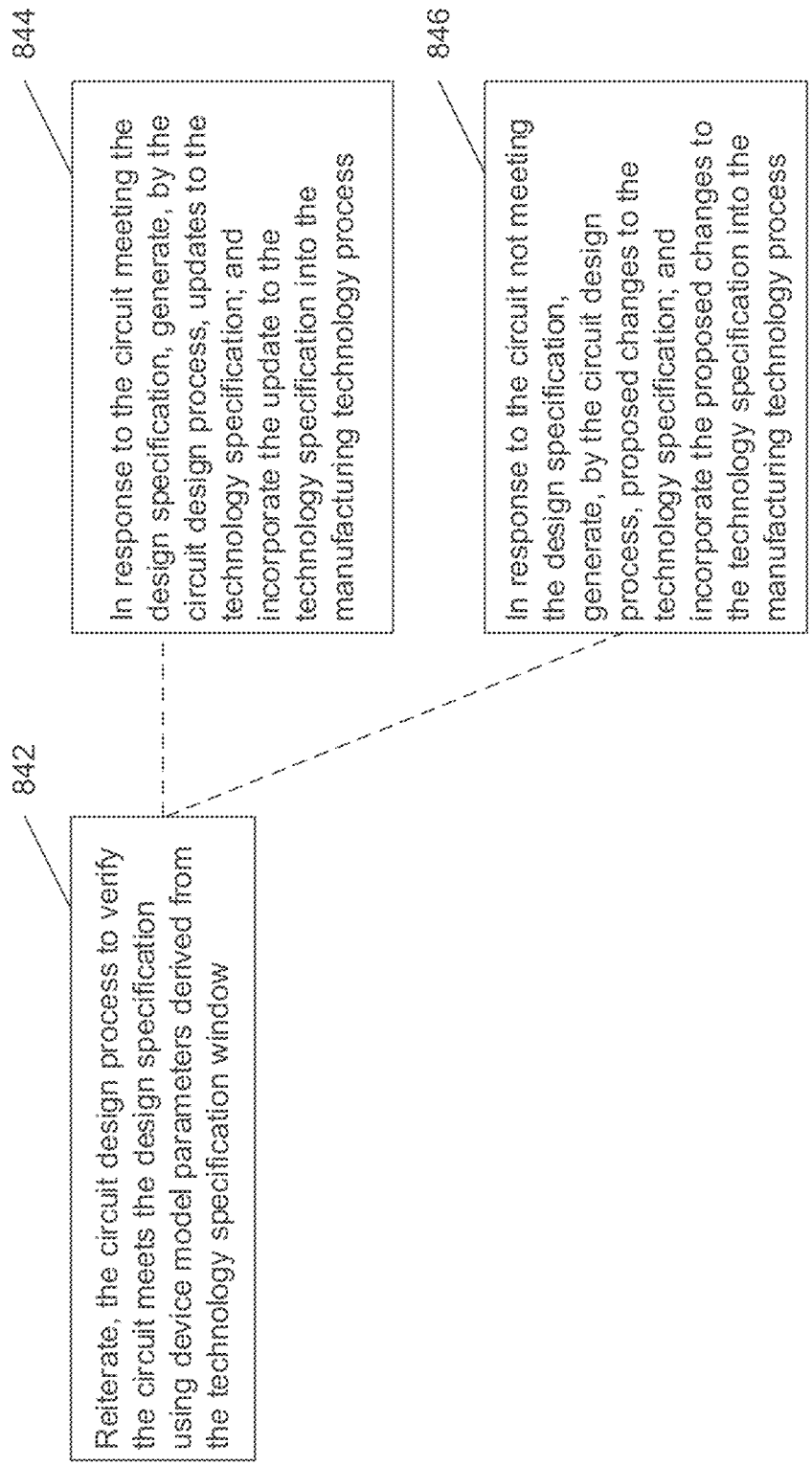
FIG. 8D illustrates an exemplary implementation of verifying whether an integrated circuit meets its design specification according to aspects of the present disclosure.

FIG. 8D illustrates an exemplary implementation of verifying whether an integrated circuit meets its design specification according to aspects of the present disclosure. In the exemplary implementation shown in FIG. 8D, in block 842, the method reiterates the circuit design process to verify the circuit meets the design specification using device model parameters derived from the technology specification window. According to aspects of the present disclosure, the methods performed in blocks 842 may optionally and/or additionally include the methods performed in blocks 844 and 846. In block 844, in response to the circuit meeting the design specification, the method generates, by the circuit design process, updates to the technology specification, and incorporates the update to the technology specification into the manufacturing technology process. In block 846, in response to the circuit not meeting the design specification, the method generates, by the circuit design process, proposed changes to the technology specification; and incorporates the proposed changes to the technology specification into the manufacturing technology process.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The system and method described above can be implemented in any suitable form, including hardware, software, firmware, or any combination of these. The system and method may optionally be implemented partly as computer software running on one or more data processors and/or digital signal processors. The elements and components of an embodiment of the system and method may be physically, functionally, and logically implemented in any suitable way. Indeed, the functionality may be implemented in a single unit, in a plurality of units, or as part of other functional units. As such, the system and method may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A computer implemented method for parallel design and technology optimization of an integrated circuit, comprising:
generating, from a manufacturing technology process, a baseline SPICE model based on technology specification and manufacturing process data;
extending the baseline SPICE model to a corresponding description of technology specification window in the circuit design process, wherein the technology specification window describes extended ranges of device model parameters;
extracting a targeted SPICE model using the technology specification window;
verifying, by a circuit design process that operates in parallel to the manufacturing technology process, the integrated circuit meets a design specification using the targeted SPICE model; and
optimizing, the manufacturing technology process and the circuit design process in parallel until the design specification is met.

2. The computer implemented method of claim 1, wherein generating the baseline SPICE model comprises:
reiterating, by a technology computer aided design tool, the manufacturing technology process to meet the technology specification.

3. The computer implemented method of claim 1, wherein extending the baseline SPICE model to a corresponding description of technology specification window comprises:
identifying a set of device model parameters having key output (KOP) targets;
identifying ranges of the key output targets based on variations of corresponding manufacturing parameters from the manufacturing technology process;
forming a plurality of combinations of key output targets; and
generating the technology specification window using the plurality of combinations of key output targets.

4. The computer implemented method of claim 3, wherein generating the technology specification window comprises:
performing tradeoffs among the plurality of combinations of key output targets to meet target criteria of the circuit; and
optimizing the set of device model parameters based on the target criteria of the circuit.

5. The computer implemented method of claim 4, wherein performing tradeoffs includes preventing overfitting of a particular key output target to achieve an overall outcome; and
optimizing the set of device model parameters includes performing partially local optimization and partially global optimization on the set of device model parameters.

6. The computer implemented method of claim 1, wherein the extended ranges of device model parameters comprises:
for each extended range of a device model parameter,
a lower boundary of the device model parameter has a first value,
an upper boundary of the device model parameter has a second value,
wherein the lower boundary and the upper boundary have values independent of each other.

7. The computer implemented method of claim 1, wherein extracting the targeted SPICE model comprises:
for each device of the integrated circuit,
providing a test data set associated with the device, wherein the test data set includes a plurality of test data obtained by testing the device under multiple sets of test conditions, and each set of test conditions includes combinations of multiple test conditions;
providing extraction conditions, the extraction conditions include a plurality of extraction condition fields that corresponds to a test condition;
receiving a user selection of one or more extraction condition fields and corresponding extraction condition input variables;
filtering the test data set to generate a targeted test data set base on the user selection; and
generating parameters of the device by fitting the targeted SPICE model of the device with the targeted test data set.

8. The computer implemented method of claim 1, wherein verifying the circuit meets the design specification comprises:
reiterating, the circuit design process to verify the circuit meets the design specification using device model parameters derived from the technology specification window.

9. The computer implemented method of claim 8, further comprising:
in response to the circuit meeting the design specification,
generating, by the circuit design process, updates to the technology specification; and
incorporating the update to the technology specification into the manufacturing technology process.

10. The computer implemented method of claim 8, further comprising:
in response to the circuit not meeting the design specification,
generating, by the circuit design process, proposed changes to the technology specification; and
incorporating the proposed changes to the technology specification into the manufacturing technology process.

11. A system for parallel design and technology optimization of an integrated circuit, comprising:
a plurality of memory configured to store data of a manufacturing technology process and a circuit design process;
a plurality of processors configured to:
generate, from the manufacturing technology process, a baseline SPICE model based on technology specification and manufacturing process data;
extend the baseline SPICE model to a corresponding description of technology specification window in the circuit design process, wherein the technology specification window describes extended ranges of device model parameters;
extract a targeted SPICE model using the technology specification window;
verify, by the circuit design process that operates in parallel to the manufacturing technology process, the integrated circuit meets a design specification using the targeted SPICE model; and
optimize, the manufacturing technology process and the circuit design process in parallel until the design specification is met.

12. The system of claim 11, wherein the plurality of processors is further configured to:
  reiterate, by a technology computer aided design tool, the manufacturing technology process to meet the technology specification.

13. The system of claim 11, wherein the plurality of processors is further configured to:
  identify a set of device model parameters having key output (KOP) targets;
  identify ranges of the key output targets based on variations of corresponding manufacturing parameters from the manufacturing technology process;
  form a plurality of combinations of key output targets; and
  generate the technology specification window using the plurality of combinations of key output targets.

14. The system of claim 13, wherein the plurality of processors is further configured to:
  perform tradeoffs among the plurality of combinations of key output targets to meet target criteria of the circuit; and
  optimize the set of device model parameters based on the target criteria of the circuit.

15. The system of claim 14, wherein
  perform tradeoffs includes preventing overfitting of a particular key output target to achieve an overall outcome; and
  optimize the set of device model parameters includes performing partially local optimization and partially global optimization on the set of device model parameters.

16. The system of claim 11, wherein the extended ranges of device model parameters comprises:
  for each extended range of a device model parameter,
  a lower boundary of the device model parameter has a first value,
  an upper boundary of the device model parameter has a second value,
  wherein the lower boundary and the upper boundary have values independent of each other.

17. The system of claim 11, wherein the plurality of processors is further configured to:
  for each device of the integrated circuit,
  provide a test data set associated with the device, wherein the test data set includes a plurality of test data obtained by testing the device under multiple sets of test conditions, and each set of test conditions includes combinations of multiple test conditions;
  provide extraction conditions, the extraction conditions include a plurality of extraction condition fields that corresponds to a test condition;
  receive a user selection of one or more extraction condition fields and corresponding extraction condition input variables;
  filter the test data set to generate a targeted test data set base on the user selection; and
  generate parameters of the device by fitting the targeted SPICE model of the device with the targeted test data set.

18. The system of claim 11, wherein the plurality of processors is further configured to:
  reiterate, the circuit design process to verify the circuit meets the design specification using device model parameters derived from the technology specification window.

19. The system of claim 18, wherein the plurality of processors is further configured to:
  in response to the circuit meeting the design specification,
  generate, by the circuit design process, updates to the technology specification; and
  incorporate the update to the technology specification into the manufacturing technology process.

20. The system of claim 18, wherein the plurality of processors is further configured to:
  in response to the circuit not meeting the design specification,
  generate, by the circuit design process, proposed changes to the technology specification; and
  incorporate the proposed changes to the technology specification into the manufacturing technology process.

* * * * *